(12) United States Patent
Telem et al.

(10) Patent No.: US 7,345,933 B1
(45) Date of Patent: Mar. 18, 2008

(54) QUALIFIED DATA STROBE SIGNAL FOR DOUBLE DATA RATE MEMORY CONTROLLER MODULE

(75) Inventors: Haggai Telem, Moshav Lachish (IL); Hagai Yoeli, Mevashert Ziyon (IL); Ohad Glazer, Raanana (IL); David Moshe, D.N. Gilboa (IL); Gidon Bratman, D.N. Misgav (IL)

(73) Assignee: Marvell Semiconductor Israel Ltd., Yokneam (IL)

( * ) Notice: Subject to any disclaimer, the term of this patent is extended or adjusted under 35 U.S.C. 154(b) by 81 days.

(21) Appl. No.: 11/176,106

(22) Filed: Jul. 7, 2005

Related U.S. Application Data

(60) Provisional application No. 60/685,938, filed on May 31, 2005, provisional application No. 60/643,498, filed on Jan. 13, 2005.

(51) Int. Cl.
*G11C 7/00* (2006.01)
*H03L 7/00* (2006.01)

(52) U.S. Cl. .............. 365/193; 365/194; 365/191; 711/167; 327/141; 327/151

(58) Field of Classification Search ........... 365/193, 365/194, 191, 233, 233.5
See application file for complete search history.

(56) References Cited

U.S. PATENT DOCUMENTS

| | | | |
|---|---|---|---|
| 5,418,822 A * | 5/1995 | Schlachter et al. ......... 375/354 |
| 6,240,043 B1 | 5/2001 | Hanson et al. |
| 6,600,681 B1 | 7/2003 | Korger et al. |
| 6,785,189 B2 | 8/2004 | Jacobs et al. |
| 6,957,399 B2 * | 10/2005 | Emberling et al. ........... 716/1 |
| 7,089,509 B2 * | 8/2006 | Emberling et al. ........... 716/1 |
| 7,219,269 B2 * | 5/2007 | Frisch ........................ 714/700 |
| 7,257,036 B2 * | 8/2007 | Chang et al. .............. 365/194 |
| 2005/0015560 A1 | 1/2005 | Bae |
| 2006/0017480 A1 * | 1/2006 | Lin ............................ 327/158 |

OTHER PUBLICATIONS

Rabaey, Jan, et al. Digital Integrated Circuits: a design perspective, 2003, Pearson Education, 2nd ed, pp. 453-459.*
Marvell International Ltd.; Discovery LT MIPS System Controller, MV64420; 2004; 2 pages.
Micron Technology, Inc.; TN-46-05 General DDR SDRAM Functionality, Technical Note; Jul. 2001; 11 pages.
Lattice Semiconductor Corporation; Dedicated DDR Memory Interface Circuity; Mar. 17, 2005; 2 pages.

* cited by examiner

*Primary Examiner*—Amir Zarabian
*Assistant Examiner*—Michael Weinberg

(57) ABSTRACT

A circuit generates a qualified data read strobe signal from a start burst signal and a bidirectional data strobe signal in a DDR memory control module. The circuit includes a delay module that receives the start burst signal and that generates a delayed start burst signal. An enable signal generator receives the delayed start burst signal and generates an enable signal. A first circuit generates the qualified data read strobe signal based on the enable signal and the bidirectional data strobe signal.

44 Claims, 5 Drawing Sheets ional Patent
QUALIFIED DATA STROBE SIGNAL FOR DOUBLE DATA RATE MEMORY CONTROLLER MODULE

CROSS-REFERENCE TO RELATED APPLICATIONS

This application claims priority of U.S. Provisional Patent Application Ser. Nos. 60/685,938, May 31, 2005 and 60/643,498, filed on Jan. 13, 2005, which are hereby incorporated by reference in their entirety.

FIELD OF THE INVENTION

The present invention relates to memory controllers and more particularly to a data strobe signal filter for a double data rate memory controller module.

BACKGROUND OF THE INVENTION

Referring now to FIG. 1, a system controller 10 is shown in communication with a CPU 12 and a double data rate (DDR) memory 14. The system controller 10 has a CPU interface module 16 that provides an interface between the CPU 12 an internal bus 18. The system controller 10 also has a DDR memory control module 20 that provides an interface between the internal bus 18 and the DDR memory 14.

Turning now to FIG. 2, signals transmitted between the DDR memory control module 20 and the DDR memory 14 are shown. An address bus ADDR carries address bus signals ADDR0-ADDRN from the DDR memory control module 20 to the DDR memory 14. A control bus CTRL carries control signals RASn, CASn, WEn, and CSn from the DDR memory control module 20 to the DDR memory 14. A clock generated by the DDR memory control module 20 is communicated to the DDR memory 14 by a differential clock signal CLK/CLKN.

A bidirectional data bus DQ is connected between the DDR memory control module 20 and the DDR memory 14. The bidirectional data bus DQ carries data bits DQ0-DQM. A bidirectional data strobe signal (DQS) can be driven either by the DDR memory control module 20 when it is writing data to the DDR memory 14 or by the DDR memory 14 when its data is being read by the DDR memory control module 20. The DDR memory control module 20 generates a data mask (DM) signal. The DM signal masks writing to specified bytes during write transactions from the DDR memory controller 20 to the DDR memory 14. The data strobe signal DQS is tri-stated between the read and write operations of the DDR memory control module 20. While the data strobe signal DQS is tri-stated, it may be undesirably influenced by neighboring signals and oscillate or float to a logic low or logic high state.

During normal operation, the DDR memory control module 20 uses leading and/or trailing edges of the data strobe signal DQS to latch incoming data that appears on the data bus DQ during read cycles. However, if the data strobe signal DQS becomes noisy while it is tri-stated, the DDR memory control module 10 may misinterpret the noise as a valid leading or trailing edge and undesirably latch invalid data from the data bus DQ.

SUMMARY OF THE INVENTION

A circuit is provided that generates a qualified data read strobe signal from a start burst signal and a bidirectional data strobe signal in a DDR memory control module. A delay module receives the start burst signal and generates a delayed start burst signal. An enable signal generator receives the delayed start burst signal and generates an enable signal. A first circuit generates the qualified data read strobe signal based on the enable signal and the bidirectional data strobe signal.

In other features, the enable signal generator includes a start module that initiates the enable signal in response to the start burst signal. The enable signal generator can also include an end module that terminates the enable signal in response to the delayed start burst signal and the qualified data read strobe signal. The end module can also terminate the enable signal in response to the delayed start burst signal, the bidirectional data strobe signal, and the enable signal.

In other features, the delay module includes a circuit board trace having a length L. The length L can be substantially equal to a sum of a first length of a first circuit trace carrying a clock signal between the DDR memory control module and a DDR memory and a second length of a second circuit trace carrying the bidirectional data strobe signal between the DDR memory and the DDR memory controller. The delay module can also include a delay generator including a plurality of predetermined delay times and a delay select signal for selecting one of the plurality of predetermined delay times. The delay module can also include an output buffer that has a module design identical to a driver of a clock signal that is associated with the start burst signal. The delay module can also include an input buffer that has a module design identical to a receiver of the bidirectional data strobe signal.

A circuit is also provided that generates a qualified data read strobe signal from a read cycle signal and a bidirectional data strobe signal in a DDR memory control module. The circuit includes a delay generator that receives the read cycle signal and that receives a delay select signal that selects a delay time from a plurality of predetermined delay times. An output generates a delayed read cycle signal. An enable signal generator receives the delayed read cycle signal and generates an enable signal. A first circuit generates the qualified data read strobe signal based on the enable signal and the bidirectional data strobe signal.

In other features, a circuit board trace is in series with the delay generator and has a length L. The length L can be substantially equal to a sum of a first length of a first circuit trace carrying a data clock signal between the DDR memory control module and a DDR memory and a second length of a second circuit trace carrying the bidirectional data strobe signal between the DDR memory and the DDR memory controller. The predetermined delay times can include a zero delay time.

In other features, the enable signal generator further includes a start module that initiates the enable signal in response to the delayed read cycle signal. The enable signal generator can include an end module that terminates the enable signal in response to the delayed read cycle signal and the qualified data read strobe signal. The end module can also terminate the enable signal in response to the delayed read cycle signal, the bidirectional data strobe signal, and the enable signal. The delay generator can include an output buffer that has a module design identical to a driver of a clock signal that is associated with the read cycle signal. The delay generator can include an input buffer that has a module design identical to a receiver of the bidirectional data strobe signal.

A method is also provided for generating a qualified data read strobe signal from a start burst signal and a bidirectional data strobe signal in a DDR memory control module. The method includes generating a delayed start burst signal from the start burst signal, generating an enable signal from the delayed start burst signal, and generating the qualified data read strobe signal based on the enable signal and the bidirectional data strobe signal.

In other features, the method can include initiating the enable signal in response to the start burst signal. The method can include terminating the enable signal in response to the delayed start burst signal and the qualified data read strobe signal. The method can also include terminating the enable signal in response to the delayed start burst signal, the qualified data read strobe signal, and the enable signal.

In other features, generating a delayed start burst signal can include propagating the start burst signal through a circuit board trace having a length L. The length L can be substantially equal to a sum of a length of a first circuit trace carrying a clock signal between the DDR memory control module and a DDR memory and a second length of a second circuit trace carrying the bidirectional data strobe signal between the DDR memory and the DDR memory controller. A delay time can also be selected from a plurality of predetermined delay times, wherein the delayed start burst signal is delayed from the start burst signal by the delay time.

In other features, generating the delayed start burst signal can include propagating the start burst signal through an output buffer that has a module design identical to a driver of a clock signal that is associated with the start burst signal. Generating the delayed start burst signal can also include propagating the start burst signal through an input buffer that has a module design identical to a receiver of the bidirectional data strobe signal.

A method is also provided for generating a qualified data read strobe signal from a read cycle signal and a bidirectional data strobe signal in a DDR memory control module. The method includes selecting a delay time from a plurality of predetermined delay times, generating a delayed read cycle signal that is delayed from the read cycle signal by the delay time, generating an enable signal from the delayed read cycle signal, and generating the qualified data read strobe signal based on the enable signal and the bidirectional data strobe signal.

In other features, generating the delayed read cycle signal can include propagating the read cycle signal through an output buffer that has a module design identical to a driver of a clock signal that is associated with the read cycle signal. Generating the delayed read cycle signal can also include propagating the read cycle signal through an input buffer that has a module design identical to a receiver of the bidirectional data strobe signal.

In other features, a circuit board trace having a length L can be connected in series with the delay generator. The length L can be substantially equal to a sum of a first length of a first circuit trace carrying a data clock signal between the DDR memory control module and a DDR memory and a second length of a second circuit trace carrying the bidirectional data strobe signal between the DDR memory and the DDR memory controller. The predetermined delay times can include a zero delay time.

In other features, the enable signal can be initiated in response to the delayed read cycle signal. The enable signal can be terminated in response to the delayed read cycle signal and the qualified data read strobe signal. The enable signal can also be terminated in response to the delayed read cycle signal, the qualified data read strobe signal, and the enable signal.

A circuit is also provided that generates a qualified data read strobe signal from a start burst signal and a bidirectional data strobe signal in a DDR memory control module. The circuit includes delay means for receiving the start burst signal and for providing a delayed start burst signal. Enable signal generating means receive the delayed start burst signal and provide an enable signal. First circuit means generate the qualified data read strobe signal based on the enable signal and the bidirectional data strobe signal.

In other features, the enable signal generating means can initiate the enable signal in response to the start burst signal. The enable signal generating means can terminate the enable signal in response to the delayed start burst signal and the qualified data read strobe signal. The enable signal generating means can also terminate the enable signal in response to the delayed start burst signal, the bidirectional data strobe signal, and the enable signal.

In other features, the delay means includes a circuit board trace having a length L. The length L can be substantially equal to a sum of a first length of a first trace means for carrying a clock signal between the DDR memory control module and a DDR memory and a second length of a second trace means for carrying the bidirectional data strobe signal between the DDR memory and the DDR memory controller.

In other features, the delay means can include delay generating means for providing a plurality of predetermined delay times and delay select means for selecting one of the plurality of predetermined delay times. The delayed start burst signal is then delayed from the start burst signal by the selected one of the predetermined delay times.

In other features, the delay means can include output buffer means that is identical to driver means of a clock signal that is associated with the start burst signal. The delay means can also include input buffer means that is identical to receiver means of the bidirectional data strobe signal.

A circuit is also provided that generates a qualified data read strobe signal from a read cycle signal and a bidirectional data strobe signal in a DDR memory control module. The circuit includes delay means for receiving the read cycle signal, for providing a delayed read cycle signal, and for selecting a delay time from a plurality of predetermined delay times. The circuit also includes enable signal generating means for receiving the delayed read cycle signal and for providing an enable signal. The circuit also includes first circuit means for generating the qualified data read strobe signal based on the enable signal and the bidirectional data strobe signal.

In other features, the circuit includes trace means for connecting and that is in series with the delay means and that has a length L. The length L can be substantially equal to a sum of a first length of first trace means for carrying a data clock signal between the DDR memory control module and a DDR memory and a second length of second trace means for carrying the bidirectional data strobe signal between the DDR memory and the DDR memory controller.

In other features, the predetermined delay times can include a zero delay time. The delay means can include output buffer means that is identical to driver means of a clock signal that is associated with the read cycle signal. The delay means can also include input buffer means that is identical to receiver means of the bidirectional data strobe signal.

In other features, the enable signal generating means initiates the enable signal in response to the delayed read cycle signal. The enable signal generating means can terminate the enable signal in response to the delayed read cycle signal and the qualified data read strobe signal. The enable signal generating means can also terminate the enable signal in response to the delayed read cycle signal, the bidirectional data strobe signal, and the enable signal.

Further areas of applicability of the present invention will become apparent from the detailed description provided hereinafter. It should be understood that the detailed description and specific examples, while indicating the preferred embodiment(s) of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
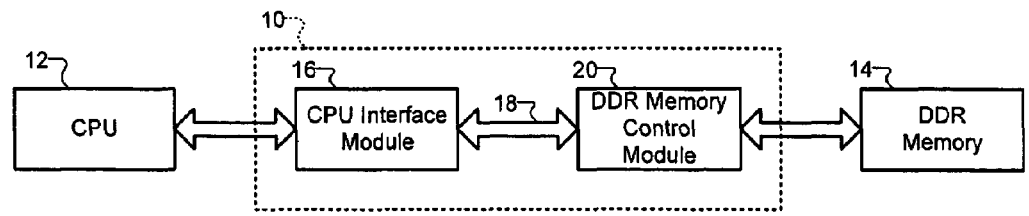
FIG. 1 is a functional block diagram of a system according to the prior art.
Figure 2:
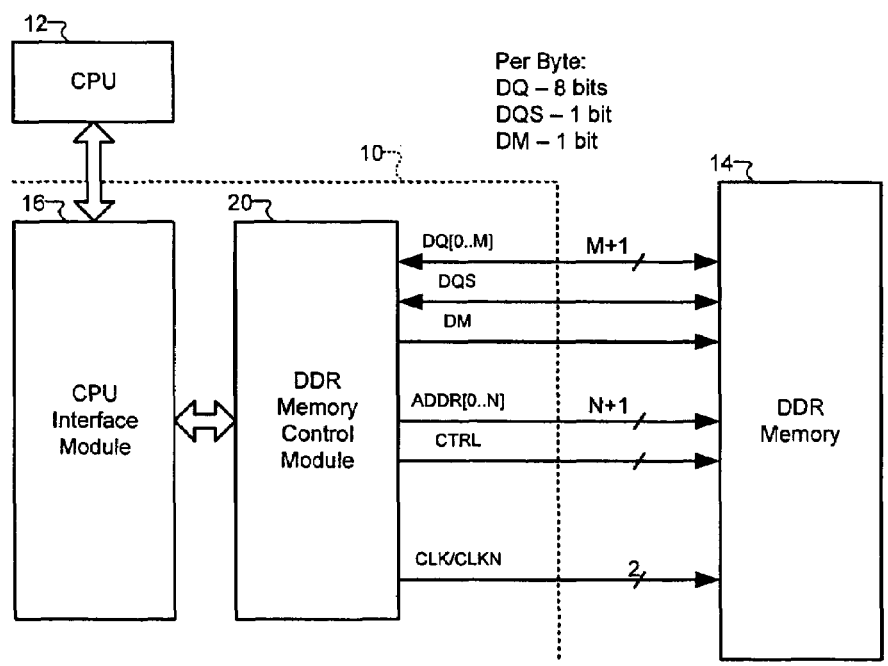
FIG. 2 is a functional block diagram showing connections between a DDR controller and a DDR memory according to the prior art.

The following description of the preferred embodiment(s) is merely exemplary in nature and is in no way intended to limit the invention, its application, or uses. For purposes of clarity, the same reference numbers will be used in the drawings to identify similar elements. As used herein, the term module, circuit and/or device refers to an Application Specific Integrated Circuit (ASIC), an electronic circuit, a processor (shared, dedicated, or group), and memory that execute one or more software or firmware programs, a combinational logic circuit, and/or other suitable components that provide the described functionality. For purposes of clarity, the same reference numerals will be used to identify similar elements. References to logical 1, true, and on are equivalent to each other, and references to logical 0, false, and off are equivalent to each other, unless otherwise noted. Parts or all of the invention may also be implemented with equivalent embodiments using logic that is inverted from that disclosed.

Figure 3:
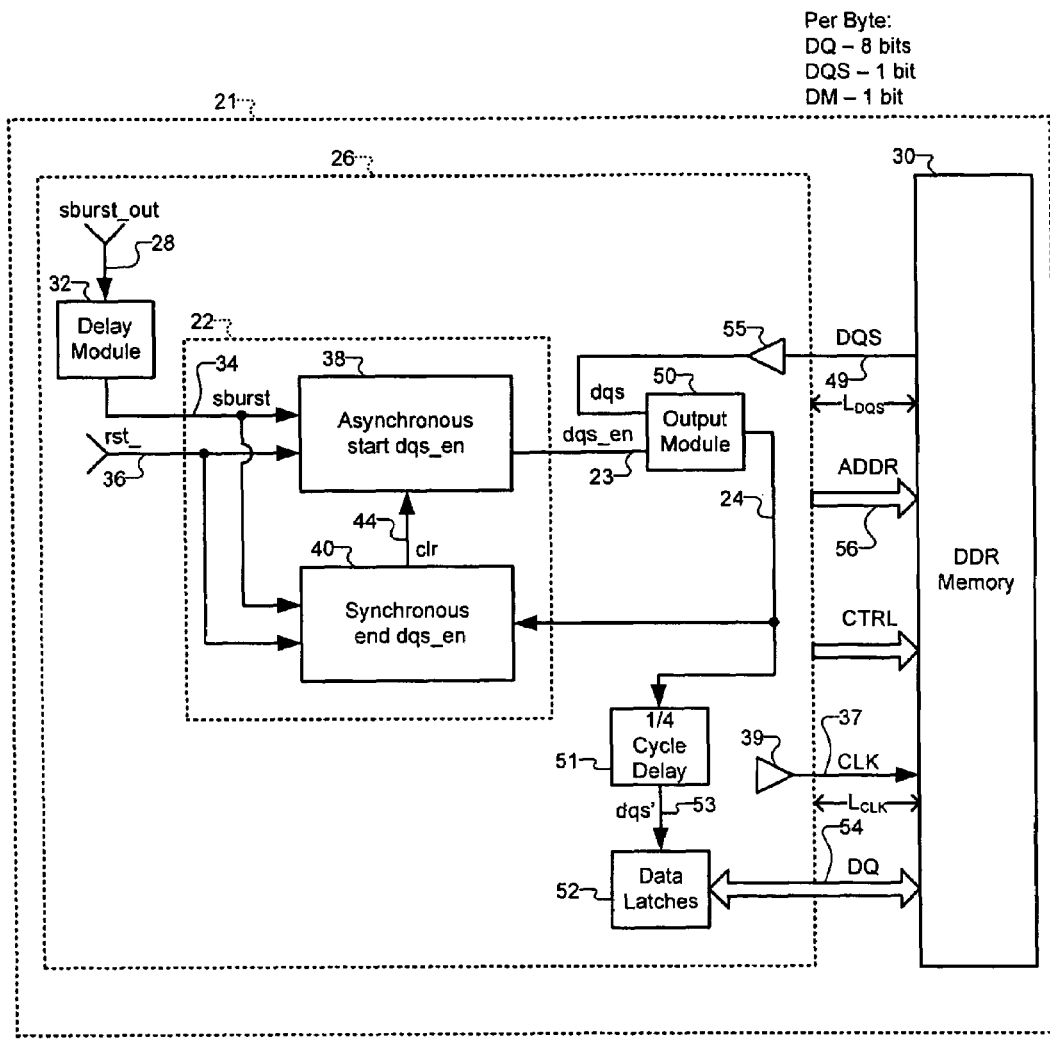
FIG. 3 is a functional block diagram of a circuit for generating a qualified strobe signal in a DDR controller.

Referring now to FIG. 3, a functional block diagram is shown of a DDR memory system 21 including an enable signal generator 22. The enable signal generator 22 provides an enable signal 23 that is used to generate a qualified data strobe signal 24 in a DDR memory control module 26. The DDR memory control module 26 generates a read cycle out (sburst_out) signal 28 before reading data from memory locations in a DDR memory 30. The read cycle out signal 28 is applied to a delay module 32 that provides a delayed read cycle signal 34. The delayed read cycle signal 34 is communicated to the enable signal generator 22. The delay module 32 will be further described in the discussion of FIG. 4.

The DDR memory control module 26 can communicate a reset signal 36 to the enable signal generator 22. The DDR memory control module 26 provides a clock signal 37 to the DDR memory 30. The clock signal 37 is buffered by a driver 39 and communicated through a circuit board trace having a length $L_{CLK}$.

The delayed read cycle signal 34 and the reset signal 36 are communicated to a start module 38 and an end module 40. The start module 38 and the end module 40 interact to provide the enable signal 23. The start module 38 generates a leading edge of the enable signal 23 in response to receiving a leading edge of the delayed read cycle signal 34. The end module 40 communicates a clear signal 44 to the start module 38. The clear signal 44 causes the start module 38 to generate a trailing edge of the enable signal 23. The end module 40 asserts the clear signal 44 in response to receiving a trailing edge of the qualified data strobe signal 24 while the delayed read cycle signal 34 is not asserted. The enable signal 23 qualifies a data strobe signal 49 that is connected between the DDR memory control module 26 and the DDR memory 30. The data strobe signal 49 has a length $L_{DQS}$ that is substantially equal to a length of a circuit board trace that connects the memory control module 26 to the DDR memory 30.

A qualified data strobe output module 50 has a first input that receives the data strobe signal 49 from a receiver 55. The qualified data strobe output module 50 has a second input that receives the enable signal 23. An output of the qualified data strobe output module 50 generates the qualified data strobe signal 24. In some implementations, the qualified data strobe output module 50 can include an AND gate. The qualified data strobe signal 24 is applied to a ¼-cycle delay module 51. The ¼-cycle delay module 51 communicates a delayed qualified data strobe (dqs') signal 53 to data latches 52. The data latches 52 latch data appearing on a data bus 54 in response to receiving the delayed qualified data strobe signal 53. The DDR memory control module 26 asserts memory addresses on an address bus 56 to indicate which memory locations in the DDR memory 30 are to provide data over the data bus 54.

Figure 4:
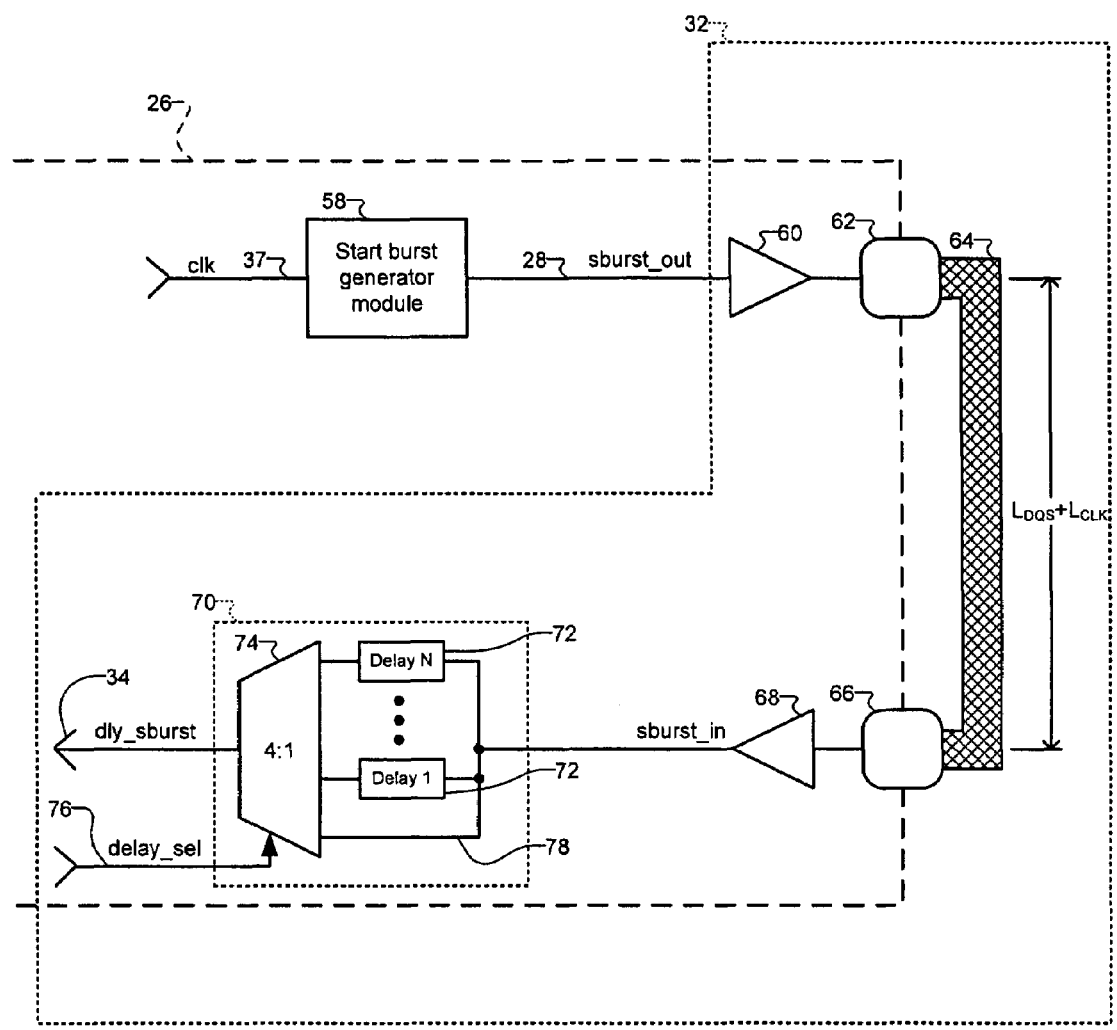
FIG. 4 is a schematic diagram of a circuit for delaying a signal generated by the DDR controller.

Referring now to FIG. 4, a functional block diagram is shown of various embodiments of the delay module 32 in communication with a read cycle signal generator module 58. The read cycle signal generator module 58 provides the read cycle out signal 28 synchronously with the clock signal 37. The read cycle out signal 28 is buffered by an output driver 60 and then communicated to an output pin 62 of the DDR memory control module 26. The read cycle out signal 28 propagates through a circuit board trace 64 having one end connected to the output pin 62 and a second end connected to an input pin 66. A length of the circuit board trace 64 should be substantially equal to the sum of the lengths $L_{DQS}$ and $L_{CLK}$. The length of the circuit board trace 64 provides a first delay of the read cycle out signal 28.

The delayed read cycle signal returns to the DDR memory control module 26 through the input pin 66. The input pin 66 communicates the delayed read cycle signal to an input buffer 68. The input buffer 68 then communicates the delayed read cycle signal to a delay generator 70. The delay generator 70 can provide additional delay to the delayed read cycle signal 34. In some embodiments, the delay generator 70 can have a plurality of delay generators having predetermined delay times 72. For example, the plurality of delay generators having predetermined delay times 72 can include delay times of 0.6 nS, 0.4 nS and/or 0.2 nS. A multiplexer 74 can have a delay select signal 76 that selects an output of one of the delay generators having a predetermined delay time 72. The delay select signal 76 can also select a zero delay time by connecting an output of the multiplexer 74 to a bypass line 78, thereby effectively disabling the delay generator 70. The output of the multiplexer 74 communicates the further delayed read cycle signal to the enable signal generator 22. The delay select signal 76 can be configured by the DDR memory control module 26. In other embodiments, the delay select signal can be configured when the DDR memory control module 26 is fabricated and/or upon each reset of the DDR memory control module.

The DDR memory control module 26 cancels timing effects of unknown factors such as PVT (Process Voltage Temperature) and/or a distance between the DDR memory control module 26 and the DDR memory 30. The timing effects of the unknown factors are cancelled by various features. One such feature includes passing the read cycle out signal 28 signal through a path having a length substantially equal to a sum of the lengths of the CLK signal 37 and the data strobe signal 49. Another such feature includes using the same module design for the output buffer 60 and the driver 39 of the CLK signal 37. Yet another such feature includes using the same module design for the input buffer 68 and the receiver 55 of the data strobe signal 49.

Figure 5:
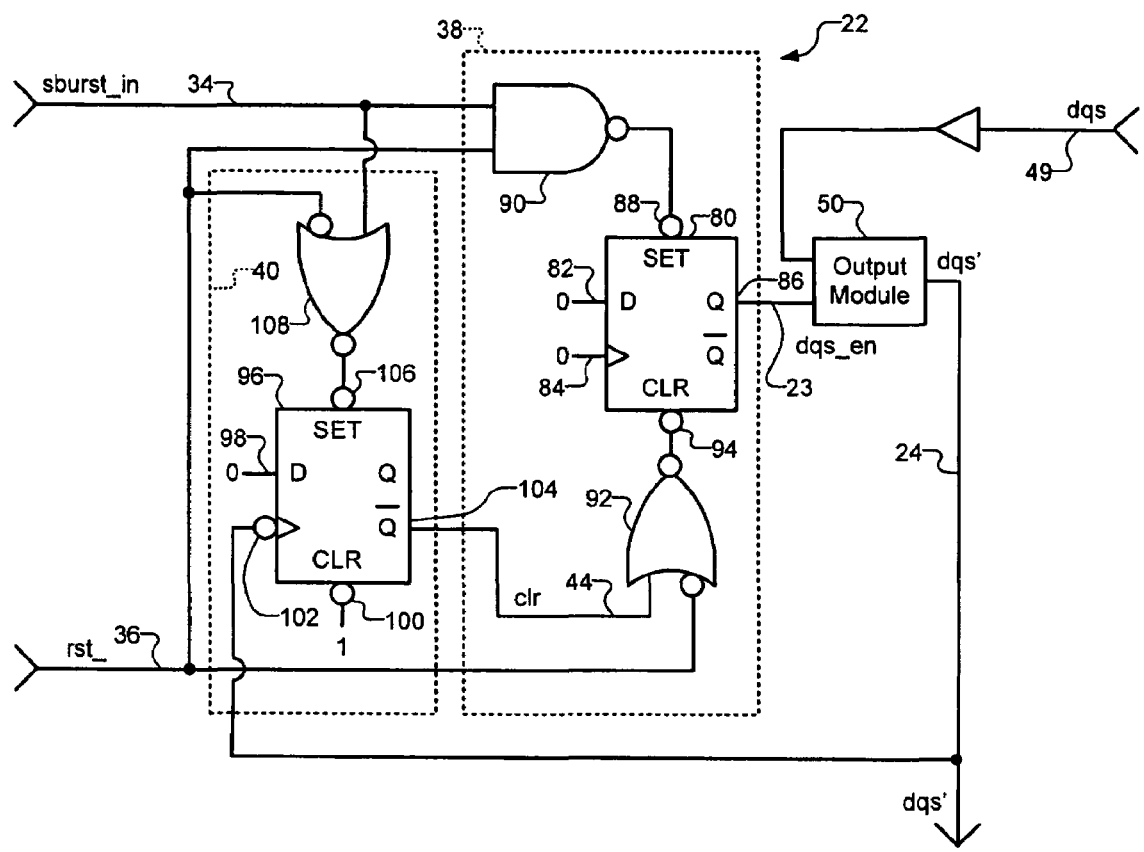
FIG. 5 is a schematic diagram of the circuit of FIG. 3.

Referring now to FIG. 5, a schematic diagram is shown of an embodiment of the enable signal generator 22. The start module 38 has a first D flip-flop 80. A D input 82 and a clock input 84 are both fixed at logical 0. A Q output 86 provides the enable signal 23. An active-low set input 88 receives a signal from an output of a NAND gate 90. The delayed read cycle signal 34 is applied to a first input of the NAND gate 90. The reset signal 36 is applied to a second input of the NAND gate 90. The NAND gate 90 inverts the delayed read cycle signal 34 and applies it to the set input 88 while the reset signal 36 is not asserted. When the reset signal 36 is asserted, the output of the NAND gate 90 is held high, which has no effect on the active-low set input 88.

A NOR gate 92 has an output connected to an active-low clear input 94 of the first D flip-flop 80. The clear signal 44 is applied to a first input of the NOR gate 92. The reset signal 36 is inverted and applied to a second input of the NOR gate 92. The NOR gate 92 inverts the clear signal 44 and applies it to the clear input 94 while the reset signal 36 is not asserted. When the reset signal 36 is asserted, the output of the NOR gate 92 is held low, thereby clearing the output 86 and deasserting the enable signal 23.

The end module 40 has a second D flip-flop 96. A D input 98 is fixed at a logical 0. An active-low clear input 100 is fixed at a logical 1. A negative edge clock input 102 is connected to the qualified data strobe signal 24. A Q-not output 104 provides the clear signal 44. An active-low set input 106 receives a signal from an output of a NOR gate 108. The delayed read cycle signal 34 is applied to a first input of the NOR gate 108. The reset signal 36 is inverted and applied to a second input of the NOR gate 108. The NOR gate 108 inverts the delayed read cycle signal 34 and applies it to the set input 106 while the reset signal 36 is not asserted. When the reset signal 36 is asserted, the output of the NOR gate 108 is held low, thereby clearing the Q-not output 104 and asserting the clear signal 44.

Figure 6:
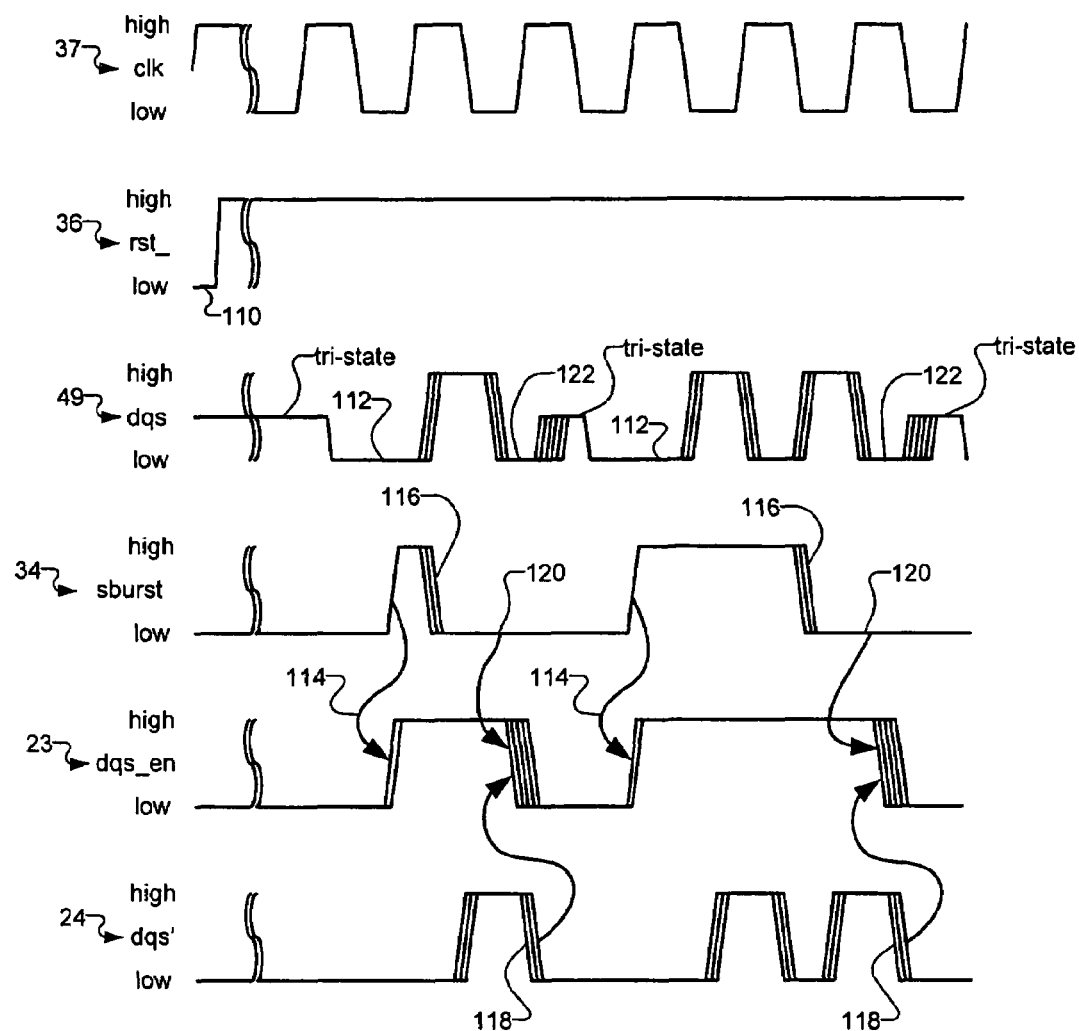
FIG. 6 illustrates a timing diagram of control and data signals related to the circuit of FIG. 5.

Referring now to FIG. 6, a timing diagram is shown of signals in the DDR memory control module 26 and the enable signal generator 22. The enable signal 23 is deasserted and the data strobe signal 49 is tri-stated while the reset signal 36 is asserted during a period 110. The DDR memory control module 26 initiates a read cycle by sending a read command to the DDR memory 30. The DDR memory 30 responds to the read command by driving the data strobe signal 49 low for a preamble period at 112. The enable signal generator 22 receives a leading edge of the delayed read cycle signal 34 during the preamble period 112. As indicated by an arrow 114, the enable signal generator 22 asserts the enable signal 23 in response to receiving the leading edge of the delayed read cycle signal 34. A duration of the delayed read cycle signal 34 is determined by an amount of data the DDR has requested from the DDR memory 30. At the end of the duration, the DDR memory control module 26 deasserts the delayed read cycle signal 34 as indicated by a trailing edge 116. The enable signal generator 22 deasserts the enable signal 23 in response to a trailing edge 118 of the qualified data strobe signal 24 that occurs while the delayed read cycle signal 34 is deasserted during a period 120. It can be seen that the enable signal 23 is asserted while the data strobe signal 49 is driven by the DDR memory 30, between the preamble period 112 and a postamble period 122. The qualified data strobe output module 50 can therefore gate the data strobe signal 49 to the qualified data strobe signal 24 while the enable signal 23 is asserted. The qualified data strobe signal 24 can be used to clock the data latches 52 (FIG. 3) during the read cycle.

The enable signal 23 terminates with the last trailing edge of the qualified data strobe signal 24, thereby ensuring that spurious transitions of the data strobe signal 49 are ignored by the DDR memory control module 26. It can be seen that the enable signal generator 22 changes the state of the enable signal 23 at substantially a center of each preamble period 112 and postamble period 122. The enable signal 23 must terminate after the last valid falling edge of the data strobe signal 49 and before the DDR memory tri-states the data signal 49.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A circuit that generates a qualified data read strobe signal from a start burst signal and a bidirectional data strobe signal in a DDR memory control module, comprising:
    a delay module that receives the start burst signal and that generates a delayed start burst signal;
    an enable signal generator that receives the delayed start burst signal and that generates an enable signal; and
    a first circuit that generates the qualified data read strobe signal based on the enable signal and the bidirectional data strobe signal,
    wherein the delay module is part of an application specific integrated circuit (ASIC) and comprises a circuit board trace having a length L that is substantially equal to a sum of a first length of a first circuit trace carrying a clock signal between the DDR memory control module and a DDR memory and a second length of a second circuit trace carrying the bidirectional data strobe signal between the DDR memory and the DDR memory controller.

2. The circuit of claim 1 wherein the enable signal generator further comprises a start module that initiates the enable signal in response to the start burst signal.

3. A circuit that generates a qualified data read strobe signal from a start burst signal and a bidirectional data strobe signal in a DDR memory control module, comprising:
    a delay module that receives the start burst signal and that generates a delayed start burst signal;

an enable signal generator that receives the delayed start burst signal and that generates an enable signal; and a first circuit that generates the qualified data read strobe signal based on the enable signal and the bidirectional data strobe signal, wherein the enable signal generator further comprises an end module that terminates the enable signal in response to the delayed start burst signal and the qualified data read strobe signal.

4. The circuit of claim 3 wherein the end module terminates the enable signal in response to the delayed start burst signal, the bidirectional data strobe signal, and the enable signal.

5. The circuit of claim 3 wherein the delay module comprises a circuit board trace having a length L.

6. The circuit of claim 5 wherein the length L is substantially equal to a sum of a first length of a first circuit trace carrying a clock signal between the DDR memory control module and a DDR memory and a second length of a second circuit trace carrying the bidirectional data strobe signal between the DDR memory and the DDR memory controller.

7. The circuit of claim 1 wherein the delay module comprises a delay generator including a plurality of predetermined delay times and a delay select signal for selecting one of the plurality of predetermined delay times.

8. The circuit of claim 1 wherein the delay module includes an output buffer that has a module design identical to a driver of a clock signal that is associated with the start burst signal.

9. The circuit of claim 1 wherein the delay module includes an input buffer that has a module design identical to a receiver of the bidirectional data strobe signal.

10. A circuit that generates a qualified data read strobe signal from a read cycle signal and a bidirectional data strobe signal in a DDR memory control module, comprising:

a delay generator that receives the read cycle signal, receives a delay select signal that selects a delay time from a plurality of predetermined delay times that are associated with a plurality of delay lines, and generates a delayed read cycle signal;

an enable signal generator that receives the delayed read cycle signal and that generates an enable signal; and a first circuit that generates the qualified data read strobe signal based on the enable signal and the bidirectional data strobe signal, wherein said enable signal generator generates said enable signal based on said delayed read cycle signal and said qualified data read strobe signal.

11. The circuit of claim 10 further comprising a circuit board trace in series with the delay generator and having a length L.

12. The circuit of claim 11 wherein the length L is substantially equal to a sum of a first length of a first circuit trace carrying a data clock signal between the DDR memory control module and a DDR memory and a second length of a second circuit trace carrying the bidirectional data strobe signal between the DDR memory and the DDR memory controller.

13. The circuit of claim 10 wherein the predetermined delay times include a zero delay time.

14. The circuit of claim 10 wherein the delay generator includes an output buffer that has a module design identical to a driver of a clock signal that is associated with the read cycle signal.

15. The circuit of claim 10 wherein the delay generator includes an input buffer that has a module design identical to a receiver of the bidirectional data strobe signal.

16. The circuit of claim 10 wherein the enable signal generator further comprises a start module that initiates the enable signal in response to the delayed read cycle signal.

17. A circuit that generates a qualified data read strobe signal from a read cycle signal and a bidirectional data strobe signal in a DDR memory control module, comprising:

a delay generator that receives the read cycle signal, receives a delay select signal that selects a delay time from a plurality of predetermined delay times, and generates a delayed read cycle signal;

an enable signal generator that receives the delayed read cycle signal and that generates an enable signal; and a first circuit that generates the qualified data read strobe signal based on the enable signal and the bidirectional data strobe signal, wherein the enable signal generator further comprises an end module that terminates the enable signal in response to the delayed read cycle signal and the qualified data read strobe signal.

18. The circuit of claim 17 wherein the end module terminates the enable signal in response to the delayed read cycle signal, the bidirectional data strobe signal, and the enable signal.

19. A method for generating a qualified data read strobe signal from a start burst signal and a bidirectional data strobe signal in a DDR memory control module, comprising:

generating a delayed start burst signal from the start burst signal;

generating an enable signal from the delayed start burst signal;

generating the qualified data read strobe signal based on the enable signal and the bidirectional data strobe signal; and initiating said enable signal based on said start burst signal and said qualified data read strobe signal.

20. The method of claim 19 further comprising initiating the enable signal in response to the start burst signal.

21. A method for generating a qualified data read strobe signal from a start burst signal and a bidirectional data strobe signal in a DDR memory control module, comprising:

generating a delayed start burst signal from the start burst signal;

generating an enable signal from the delayed start burst signal;

generating the qualified data read strobe signal based on the enable signal and the bidirectional data strobe signal; and terminating the enable signal in response to the delayed start burst signal and the qualified data read strobe signal.

22. The method of claim 21 further comprising terminating the enable signal in response to the delayed start burst signal, the qualified data read strobe signal, and the enable signal.

23. The method of claim 19 wherein generating the delayed start burst signal includes propagating the start burst signal through a circuit board trace having a length L.

24. The method of claim 23 wherein the length L is substantially equal to a sum of a first length of a first circuit trace carrying a clock signal between the DDR memory control module and a DDR memory and a second length of a second circuit trace carrying the bidirectional data strobe signal between the DDR memory and the DDR memory controller.

25. The method of claim 19 further comprising selecting a delay time from a plurality of predetermined delay times, wherein the delayed start burst signal is delayed from the start burst signal by the delay time.

26. The circuit of claim 19 wherein generating the delayed start burst signal includes propagating the start burst signal through an output buffer that has a module design identical to a driver of a clock signal that is associated with the start burst signal.

27. The circuit of claim 19 wherein generating the delayed start burst signal includes propagating the start burst signal through an input buffer that has a module design identical to a receiver of the bidirectional data strobe signal.

28. A method for generating a qualified data read strobe signal from a read cycle signal and a bidirectional data strobe signal in a DDR memory control module, comprising:
   selecting a delay time from a plurality of predetermined delay times;
   generating a delayed read cycle signal that is delayed from the read cycle signal by the delay time;
   generating an enable signal from the delayed read cycle signal; and
   generating the qualified data read strobe signal based on the enable signal and the bidirectional data strobe signal,
   wherein the step of generating the delayed read cycle signal includes propagating the read cycle signal through a buffer that has a module design identical to a driver of at least one of a clock signal, that is associated with the read cycle signal, and a receiver of the bidirectional data strobe signal.

29. The method of claim 28 further comprising connecting a circuit board trace having a length L in series with the delay generator.

30. The method of claim 29 wherein the length L is substantially equal to a sum of a first length of a first circuit trace carrying a data clock signal between the DDR memory control module and a DDR memory and a second length of a second circuit trace carrying the bidirectional data strobe signal between the DDR memory and the DDR memory controller.

31. The method of claim 28 wherein the predetermined delay times include a zero delay time.

32. The method of claim 28 further comprising initiating the enable signal in response to the delayed read cycle signal.

33. A method for generating a qualified data read strobe signal from a read cycle signal and a bidirectional data strobe signal in a DDR memory control module, comprising:
   selecting a delay time from a plurality of predetermined delay times;
   generating a delayed read cycle signal that is delayed from the read cycle signal by the delay time;
   generating an enable signal from the delayed read cycle signal;
   generating the qualified data read strobe signal based on the enable signal and the bidirectional data strobe signal;
   terminating the enable signal in response to the delayed read cycle signal and the qualified data read strobe signal.

34. The method of claim 28 further comprising terminating the enable signal in response to the delayed read cycle signal, the qualified data read strobe signal, and the enable signal.

35. The circuit of claim 1 wherein said length L is equal to a sum of the first length and the second length.

36. The circuit of claim 1 wherein said delay module comprises a delay generator that receives the start burst signal, that receives a delay select signal that selects a delay time from a plurality of predetermined delay times, and that generates said delayed start burst signal.

37. The circuit of claim 36 wherein said plurality of predetermined delay times are associated with a plurality of delay lines.

38. The circuit of claim 10 wherein said plurality of delay lines are part of an application specific integrated circuit (ASIC).

39. The method of claim 19 wherein said enable signal is initiated in a center of a preamble period prior to assertion of said data strobe signal.

40. A circuit that generates a qualified data read strobe signal from a start burst signal and a bidirectional data strobe signal in a DDR memory control module, comprising:
   a delay module that receives the start burst signal and that generates a delayed start burst signal;
   an enable signal generator that receives the delayed start burst signal and that generates an enable signal based on an externally received reset signal; and
   a first circuit that generates the qualified data read strobe signal based on the enable signal and the bidirectional data strobe signal.

41. The circuit of claim 40 wherein the enable signal generator further comprises a start module that initiates the enable signal based on said externally received reset signal.

42. The circuit of claim 41 wherein the enable signal generator further comprises a start module that initiates the enable signal based on said start burst signal.

43. The circuit of claim 40 wherein the enable signal generator further comprises an end module that terminates the enable signal based on said externally received reset signal.

44. The circuit of claim 43 wherein the enable signal generator further comprises an end module that terminates the enable signal based on said start burst signal.

* * * * *

UNITED STATES PATENT AND TRADEMARK OFFICE
CERTIFICATE OF CORRECTION

PATENT NO. : 7,345,933 B1  Page 1 of 1
APPLICATION NO. : 11/176106
DATED : March 18, 2008
INVENTOR(S) : Haggai Telem et al.

It is certified that error appears in the above-identified patent and that said Letters Patent is hereby corrected as shown below:

Column 1, Line 25    Delete "an" and insert -- and --

Signed and Sealed this

Seventeenth Day of June, 2008

JON W. DUDAS
*Director of the United States Patent and Trademark Office*